United States Patent [19]
Burgess

[11] 3,999,965
[45] Dec. 28, 1976

[54] LIQUID TREATING APPARATUS

[76] Inventor: Harry L. Burgess, 5400 Memorial Drive, Apt. 511, Houston, Tex. 77007

[22] Filed: Apr. 14, 1975

[21] Appl. No.: 567,733

[52] U.S. Cl. .................................. 55/164; 55/184; 55/203; 55/215; 55/218

[51] Int. Cl.² ........................................ B01D 19/00

[58] Field of Search ................ 55/52, 55, 164, 165, 55/184, 199, 201, 202, 203, 215, 218, 403, 408, 409, 178; 175/63

[56] References Cited

UNITED STATES PATENTS

| | | | |
|---|---|---|---|
| 702,795 | 6/1902 | Holmes | 55/203 X |
| 1,547,429 | 7/1925 | Ludeman | 55/215 |
| 1,847,648 | 3/1932 | Harkom | 55/178 |
| 2,046,904 | 7/1936 | Morgan | 55/178 |
| 2,425,410 | 8/1947 | Zeitlin et al. | 55/409 |
| 2,575,568 | 11/1951 | Topanelian, Jr. | 55/199 |
| 3,271,929 | 9/1966 | Bowden et al. | 55/52 |
| 3,296,776 | 1/1967 | Youngman | 55/165 |
| 3,300,950 | 1/1967 | Carle | 55/199 |

Primary Examiner—Frank A. Spear, Jr.
Assistant Examiner—R. G. Mukai
Attorney, Agent, or Firm—Bertram H. Mann

[57] ABSTRACT

Liquid treating apparatus, for instance, a degasser for contaminated drilling mud returned from a well, comprising a treating chamber in which liquid to be treated is subjected to a suction source. A centrifugal impeller is rotatably mounted immediately adjacent the suction source communication with the chamber for repelling liquid droplets tending to enter the suction source, while admitting gaseous matter into the suction source.

3 Claims, 5 Drawing Figures

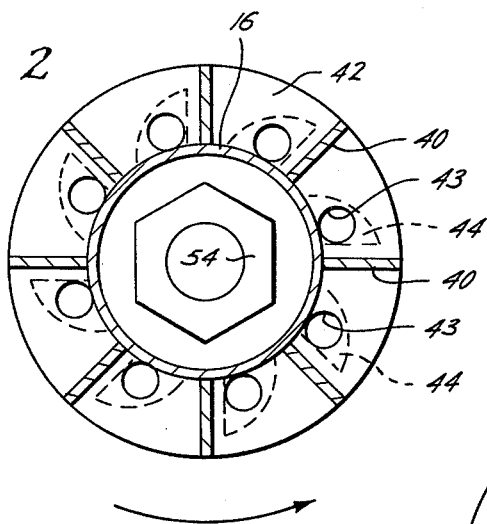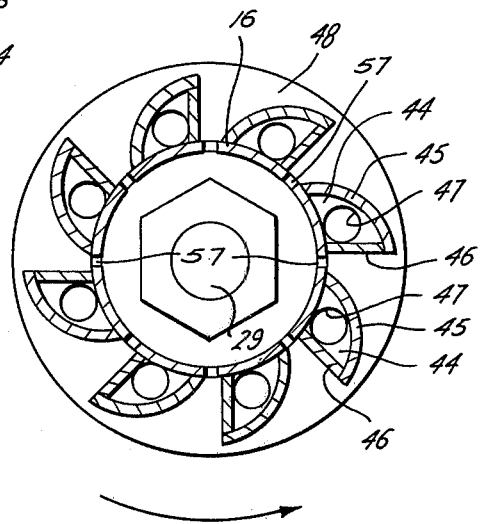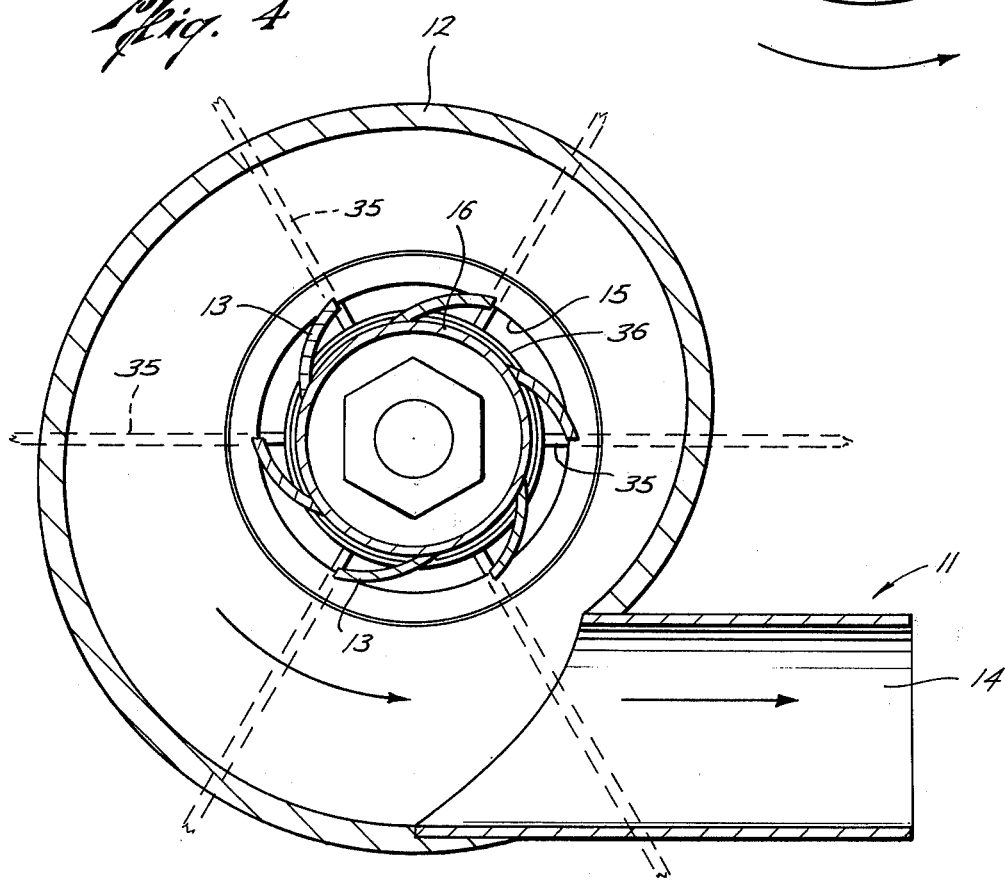

LIQUID TREATING APPARATUS

BACKGROUND OF THE INVENTION

This invention relates to liquid treaters, as, for instance, gas and liquid separating apparatus, called degassers, of the type advantageously used in reconditioning drilling mud returned from an oil or gas well drilling operation.

Previous devices of this type have been bulky, heavy, complicated and expensive. Floats or overflows have been provided customarily to prevent drawing of liquid into the gas evacuation pump. My copending application Ser. No. 483,935, filed June 21, 1974, and now U.S. Pat. No. 3,973,930 which is a continuation of my application Ser. No. 404,399, filed Oct. 9, 1973, discloses and claims certain novel features of a simplified floatless degasser also disclosed in the present application for overcoming these disadvantages.

The main object of the present invention is to provide novel means to prevent liquid in a chamber from entering a suction source communicating with the chamber. Another object is to provide liquid treating apparatus, for instance, of the general type disclosed in said applications, with improved means for maintaining the treated liquid level in the chamber at or below a predetermined maximum or constant level.

Another object is to provide gas and liquid separating apparatus requiring the use of substantially less power than is required by the apparatus of said applications, yet which is equally effective as a degasser.

SUMMARY OF AN EXEMPLARY FORM

In accordance with one form of the present invention, a treating chamber has a central, rotary, pipe-like inlet body extending vertically into the chamber for supplying thereto liquid to be treated, such as contaminated drilling mud, and a coaxial drive shaft secured to the upper end of the inlet body and extending through the top of the chamber. Suction and power means are mounted on the chamber and operatively connected, respectively, to suction porting in the chamber wall and to the drive shaft for evacuating the chamber and rotating the inlet body.

Openings are provided in the wall of the mentioned inlet body for slinging the contaminated mud centrifugally into the treating chamber. Decontaminated liquid is withdrawn from the lower part of the chamber. Impeller blades on or movable with the rotary body are positioned adjacent the suction porting so as to repel liquid from the porting, while permitting the drawing of gas from the chamber thereinto. The rotary velocity of the inlet body is related to the effective suction applied to the chamber and the rate of withdrawal of liquid from the chamber so as to prevent the liquid level in the chamber from rising above a predetermined optimum level below the suction inlet porting abnormal rising of the liquid level increasingly immerses (occludes) the liquid inlet porting so as to restrict the inflow of liquid.

BRIEF DESCRIPTION OF THE DRAWINGS

In the accompanying drawings which illustrate the invention,

FIGS. 2, 3, and 4 are detail horizontal sections taken on the corresponding section lines of FIG. 1.

DETAIL DESCRIPTION OF THE DRAWINGS

Figure 1:
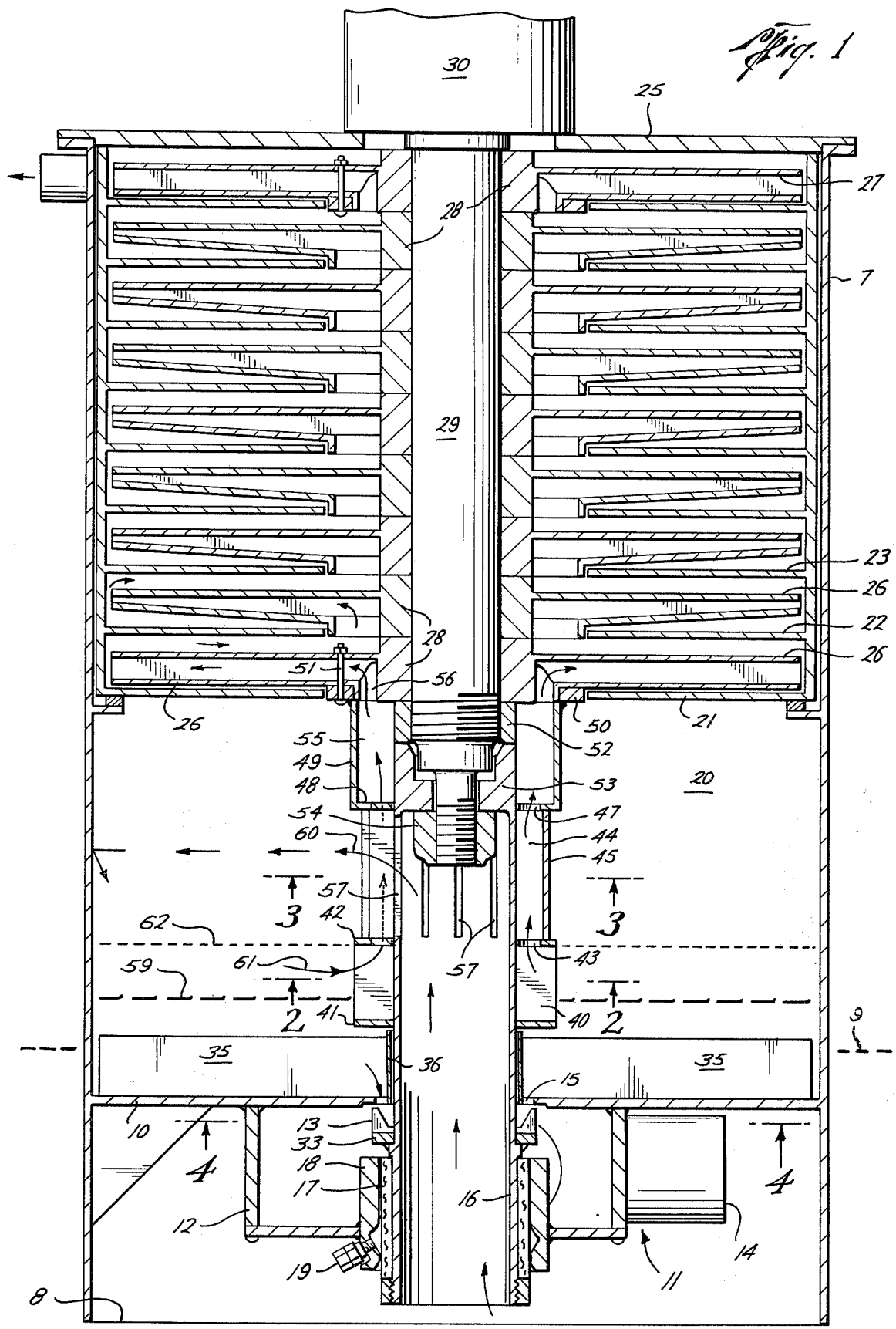
FIG. 1 is an over-all vertical transverse section through a form of the novel apparatus.

The apparatus comprises a cylindrical vessel or casing 7 which is open at the bottom, as at 8, and which, preferably, is mounted for gravity feed from a mud return tank or pond for association with oil well drilling equipment. A floor 10 traverses the casing near the bottom thereof and supports on its underside the toroidal housing portion 12 of a centrifugal liquid discharge pump, generally designated 11 and including impeller blades 13 and a clean mud outlet 14 (FIG. 4). Extending vertically through the clean mud discharge port 15 in floor 10 and suitably supported in the chamber is the rotary inlet pipe or body 16 which admits contaminated liquid to the apparatus. Pipe 16 carries a suitable journal or bushing 17 which rotates within a journal bearing or sleeve 18 in liquid discharge pump housing 12. A fitting 19 may be provided for flushing or lubricating the bearings, or circulation from chamber 20 may be relied on for this purpose.

Pipe 16 extends centrally partway through the degassing chamber 20 formed by casing 7 and is covered at the top by means of a plate 21. Mounted above chamber 20 is a series of centrifugal suction pumps constructed of housing forming annular partition plates 22, 23, etc., and closed at the top by a cover plate 25. Running in the toroidal housings formed by the mentioned plates 22, 23, etc., and 25 are centrifugal impellers 26, etc., terminating at the top with an impeller 27, all being secured to and projecting outwardly from blocks 28 rigidly mounted on a drive shaft 29 which extends through cover plate 25 and to powering motor 30 mounted above plate 25. The arrangement is such that motor 30 rotatably drives shaft 29 the impellers, and inlet pipe or body 16 as a unit relative to casing 7.

Secured to pipe 16 just beneath treated liquid outlet 15 are impeller blades 13 mounted on a base disk 33 which with housing 12 form a centrifugal pump, as previously mentioned, for aiding in the drawing of treated mud through opening 15 and discharging the same through tangential outlet 14. Opening 15 defines in part the inlet throat of pump 11. In order to prevent vortexing or cavitating of the liquid in outlet 15, radial vanes 35 are provided on the upper surface of base plate or floor 10 extending to a vertical collar 36 slightly spaced from the wall of pipe 16. A slight clearance between collar 36 and pipe or body 16 receives bearing clean-out and/or lubricating liquid from chamber 20.

Slightly above vanes 35, an annular series of radial impeller blades 40 (FIG. 2) project outwardly from pipe body 16 between bottom and top disks 41 and 42. Openings 43 in upper disk 42 connect the central part of the upper face of this impeller (i.e., the inlet throat portion thereof) with registering passages 44 formed by reversely curving walls 45 and radial end walls 46 secured to and projecting outwardly from the upper portion of pipe 16 (FIG. 3). The reverse inclination of passage walls 45 is such as to provide minimum centrifugal effect, and registering openings 43 may be of the same cross-sectional shape as passages 44. The latter passages are better shown in FIG. 3 which also illustrates registering ports 47 in a transverse plate 48 at the bottom of an annular wall 49 depending from and rigid with an annular block 50 secured by bolts 51 to lowermost suction impeller 26.

At the centers of impellers 26, etc., are the annular blocks 28 which abut and rotate with drive shaft 29 and are in a vertical series extending upwardly along the drive shaft and each secured to one of the suction impellers. All of the blocks 28 and, consequently, the suction impellers are locked in position by a nut 52 threaded on the drive shaft. Abutting the undersurface of nut 52 is an angular bushing collar 53, in turn held in place by a second nut 54 also threaded on the drive shaft. Wall 49 and members 52 and 53 form an annular extension 55 of the inlet throat 56 of lowermost centrifugal impeller 26 which, of course, communicates serially with the surmounted centrifugal impellers. Thus, the cumulative suction produced by the suction impellers communicates with the interior of the treating chamber above the fuel level therein through throat 56, annular extension 55, ports 47, passages 44, opening 43, and the spaces between radial impeller blades 40.

An annular series of slots 57 are formed in the wall of pipe or body 16 between suction passage forming walls 45 and 46 (FIG. 3) for admitting liquid into the chamber 20 under the influence of centrifugal force and the chamber suction supplied from the suction pumps.

Figure 5:
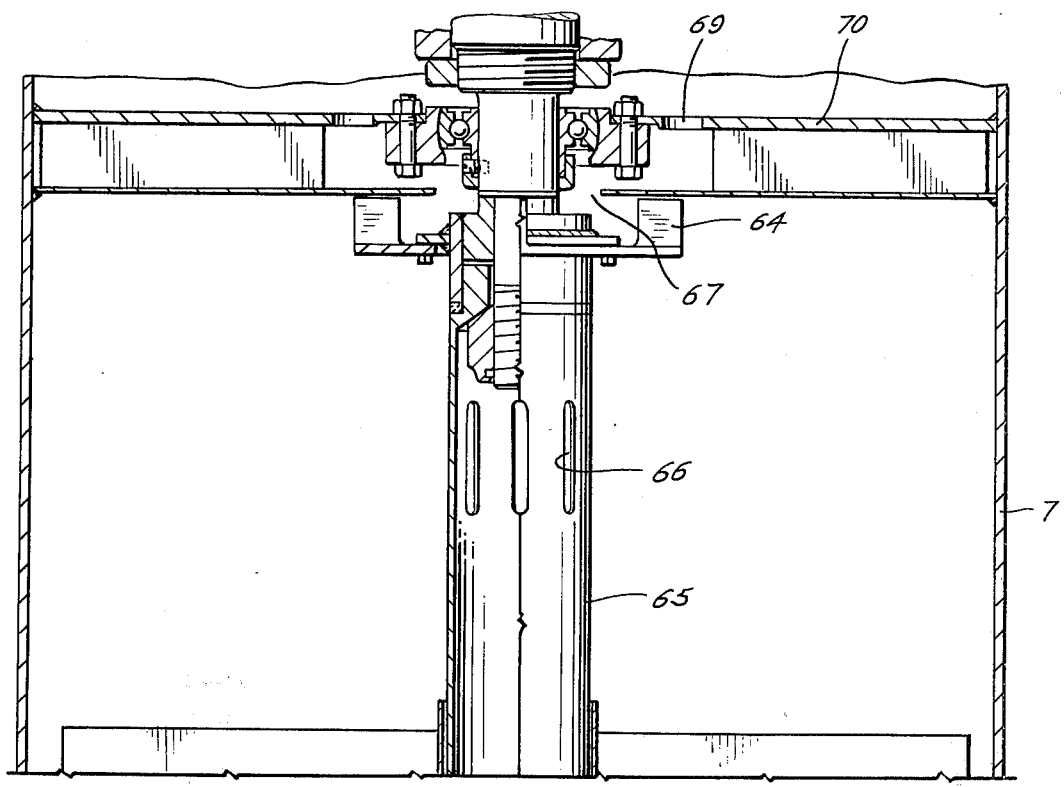
FIG. 5 is a view similar to a portion of FIG. 1, but showing a modification.

In the form of FIG. 5, liquid repelling blades 64 are mounted on rotary inlet body 65 substantially above contaminated liquid inlet slots 66 and immediately beneath (i.e., upstream of) the initial inlet throat 67 of the suction pump series. Throat 67 communicates with throat 68 through holes 69 in bottom plate 70.

Operation

The apparatus described is a degasser for contaminated drilling mud returned from a well. In operation, casing 7 is placed in communication with the liquid in a returned mud tank for an oil well drilling operation and may be maintained at a substantially uniform level relative to the level of liquid in the latter, as explained in said copending application Ser. No. 483,935. Motor 30 is then energized to rotate drive shaft 29 and, with it, the suction impellers as well as liquid repelling impellers 40 and degassed liquid discharge impellers 13. The static depression in chamber 20 and the centrifugal force induced by rotary pipe or body 16 cause the impelling of contaminated liquid through slots 57 into chamber 20 (arrows 60) wherein, because of the suddenly reduced pressure and turbulence due in part to liquid striking casing wall 7, gas is separated from the liquid and rises to the top of the chamber, while the liquid drops to the bottom upon floor 10. Liquid accumulating on floor 10 is drawn downwardly through inlet throat opening 15 and is discharged by the degassed liquid pump 11 to a suitable container or elsewhere. Radial vanes 35 on floor 10 overlap inlet throat opening 15 of pump 11 so as to effectively prevent vortexing of the degassed liquid. Bearings or bushings 17 and 18 are maintained free-running by flushing action of the liquid or through fitting 19.

The surface of the degassed liquid in chamber 20 may rise until reaching an optimum level, as 59, abreast of and partially immersing radial blades 40 and intermediate of end plates 41 and 42. This level will be maintained if the forces tending to discharge the degassed liquid, including the gas pressure in the upper part of chamber 20, the head of the degassed liquid, and the effect of liquid discharge pump 11, exactly counterbalance the positive pressure in inlet body 16. The suction path of gases into the surmounting suction pump is indicated by arrow 61.

The annular space between optimum or normal level 59 and the bottom of plate 42 constitutes the effective suction communication or porting and gas outlet opening in the chamber wall; and, when the surface of the degassed liquid is at the maximum level 59, the area of this annulus equals the total cross-sectional areas of openings 43 so that this annulus, i.e. the gas exhaust porting constitutes the control region of the suction communication with degassing chamber 20. The result of this is that variations of the liquid level above or below the level 59 inversely vary the effectiveness of the suction transmission to chamber 20. Consequently, if the liquid level in chamber 20 should rise above the level 59, the effective suction path into the top of the chamber would be progressively reduced until ultimately, when the liquid reaches the level 62, the suction porting is sealed and the application of suction to the chamber is substantially eliminated. As the result, the gas pressure in the top of chamber 20 increases so as to reduce the rate of entry of contaminated liquid through inlet slots 57 which, in turn, lowers the liquid level until a balance is again reached. Radial impeller blades 40 serve the purpose of centrifugally repelling the heavier liquid droplets from the gas outlet opening without, however, having the same effect upon the gases drawn into passages 44, the suction effect of multiple impellers 26, etc., insuring continued sucking of gases from the separating chamber as well as effective degassing of the entering liquid.

In the modification of FIG. 5, the liquid impeller blades are located immediately adjacent the suction inlet throat 67 so as to repel any droplets which may tend to enter the gas exhaust porting. Normally, the level of liquid will be abreast of or below inlet slots 66 so that discharge of gases in the upper part of the chamber will not be impeded. The functioning is similar to that in FIG. 1 in which the effective inlet throat of the suction means and blades 40 are located intermediately in the degassing chamber. However, in this form, the contaminated mud inlet porting slots 66 form the control or "scheduling" porting so that rising of liquid in the chamber above the optimum level increasingly restricts this porting so as to reduce the inflow of contaiminated mud without affecting the exhausting of gas.

The principle herein disclosed of preventing liquid drawn into a treating tank by suction from entering the suction source, without the use of a float or overflow, may be applied to other uses, for instance, where drilling mud is desanded, as disclosed in the above copending applications, or otherwise treated in the suction chamber.

Accordingly, effective degassing is accomplished with the use of minimum power due to the minimum radial extent of the rotating structure and without the use of the customary multiple baffles. Furthermore, the passage of liquid into the suction pump is effectively limited without the use of the customary floats or overflow pipes. Various features may be modified as will occur to those skilled in the art, and the exclusive use of all modifications as come within the scope of the appended claims is contemplated.

I claim:
1. Degassing apparatus comprising
   a. a casing forming a liquid treating chamber,
   b. a hollow body extending upwardly into said chamber and having inlet openings (outside and) inside said chamber for admitting contaminated liquid into said chamber,
   c. drive shaft means aligned with and secured to said body, d. power means operatively connected to said shaft means for rotating the same and said body relative to said chamber,
e. suction pump means operatively connected to said drive shaft means and said power means,
f. porting means constructed adjacent to said suction pump means for communicating suction from said pump means to said chamber for removing gas therefrom,
g. centrifugal impeller means on said (pipe means) body adjacent said porting means, and
h. a discharge pump means on said (pipe means) body beneath said chamber and communicating with said chamber through the lower part thereof,
i. said impeller, suction pump, and discharge pump means being (normally) adjusted and said porting means being constructed and arranged so as to cause said porting means to be progressively occluded (, as) as the liquid rises (rises) in said chamber to thereby decrease the drawing of gas therethrough and the rate of admission of liquid into said chamber.

2. Degassing apparatus as described in claim 1 in which said porting means and said centrifugal impeller are located substantially above the inlet openings in said body.

3. Degassing apparatus comprising
a. a casing forming a liquid treating chamber,
b. a hollow body extending upwardly into said chamber and having openings inside said chamber for admitting contaminated liquid into said chamber,
c. drive shaft means aligned with and secured to said body,
d. power means operatively connected to said shaft means for rotating the same and said body relative to said chamber,
e. suction pump means operatively connected to said drive shaft means and said power means,
f. porting in a wall of said chamber for communicating suction from said pump means to said chamber for removing gas therefrom,
g. centrifugal impeller means on said body adjacent said porting, and
h. a discharge pump means on said body beneath said chamber and communicating with said chamber through the lower part thereof.

* * * * *